(12) United States Patent
Kuge et al.

(10) Patent No.: US 8,915,115 B2
(45) Date of Patent: Dec. 23, 2014

(54) PISTON PROVER

(75) Inventors: Hirokazu Kuge, Tokyo (JP); Hajime Iida, Tokyo (JP)

(73) Assignee: Oval Corporation, Tokyo (JP)

( * ) Notice: Subject to any disclaimer, the term of this patent is extended or adjusted under 35 U.S.C. 154(b) by 232 days.

(21) Appl. No.: 13/703,789

(22) PCT Filed: Mar. 23, 2011

(86) PCT No.: PCT/JP2011/056924
§ 371 (c)(1),
(2), (4) Date: Dec. 12, 2012

(87) PCT Pub. No.: WO2012/005028
PCT Pub. Date: Jan. 12, 2012

(65) Prior Publication Data
US 2013/0091923 A1    Apr. 18, 2013

(30) Foreign Application Priority Data
Jul. 9, 2010    (JP) .................................. 2010-156458

(51) Int. Cl.
*G01F 25/00*    (2006.01)
(52) U.S. Cl.
CPC .................................. *G01F 25/0015* (2013.01)
USPC ........................................... 73/1.19; 73/1.22
(58) Field of Classification Search
CPC .................................................. G01F 25/0015
USPC ................................ 73/1.18, 1.19, 1.22, 1.23
See application file for complete search history.

(56) References Cited

U.S. PATENT DOCUMENTS

| 3,541,837 | A | * | 11/1970 | Davis et al. ..................... 73/1.18 |
| 3,673,851 | A |   | 7/1972 | Wright et al. |
| 3,768,510 | A | * | 10/1973 | Reves ............................ 137/551 |
| 5,076,093 | A | * | 12/1991 | Jones et al. .................... 73/1.22 |
| 5,170,656 | A | * | 12/1992 | Draus ............................. 73/1.22 |
| 5,392,632 | A | * | 2/1995 | Umeda et al. .................. 73/1.73 |

FOREIGN PATENT DOCUMENTS

| CN | 2544260 | 4/2003 |
| JP | 61-073024 | 4/1986 |
| JP | 64-055422 | 4/1989 |
| JP | 5-107101 | 4/1993 |
| JP | 5-018666 | 5/1993 |
| JP | 5-071887 | 10/1993 |
| JP | 2796207 | 9/1998 |

* cited by examiner

*Primary Examiner* — Hezron E Williams
*Assistant Examiner* — Nathaniel Kolb
(74) *Attorney, Agent, or Firm* — Jordan and Hamburg LLP

(57) ABSTRACT

A piston prover comprises a measurement cylinder; a hydraulic cylinder coupled with a downstream end of the measurement cylinder; a measuring piston that moves a predetermined distance through the measurement cylinder during a measurement due to a fluid flow to eject a reference volume of fluid; and a piston rod that is movably in the hydraulic cylinder, wherein the measuring piston and the piston rod are separately constructed. When returning the measuring piston to a predetermined upstream measurement standby position, the piston rod moves the measuring piston to set the measuring piston at the predetermined measurement standby position, and thereafter only the piston rod is moved from upstream to downstream and is accommodated in the hydraulic cylinder.

3 Claims, 8 Drawing Sheets

PISTON PROVER

TECHNICAL FIELD

The present invention relates to a piston prover and, more particularly, to a piston prover of the type having a reduced reference volume for proving the accuracy of a flowmeter.

BACKGROUND OF THE INVENTION

A proving device for proving a flowmeter is a device for subjecting a newly manufactured flowmeter or a flowmeter in use to a characteristic test periodically or at any timing in order to use the flowmeter at a reliable accuracy regardless of a change in the characteristics attributable to external factors such as temperature and pressure or to internal factors such as abrasion of moving parts. Broadly classified, the characteristic test is carried out by two methods, one using a calibrator that sets a flowmeter to be test in a fixed tester to perform the test and the other using a prover type flowmeter tester that sets the flowmeter in a fluid system to optionally perform the test.

Since the prover type flowmeter tester can perform the flowmeter characteristic test on line and perform any characteristic test as needed, it is often used in the test of an inferential flowmeter especially susceptible to piping, e.g. of a turbine meter. The prover is a device having a moving element such as a piston that moves through a pipe with a constant section in synchronism with fluid and using as a reference volume a fluid displaced by the movement of the moving element through a predetermined distance.

In the flowmeter characteristic test using the prover type flowmeter tester, the number of flow pulses sent per unit volume (flow rate coefficient), i.e., a so-called K factor is calculated from the reading of the flowmeter when a fluid of a reference volume specified by the prover passes therethrough, that is, by detecting the number of flow pulses sent from the flowmeter when a reference volume of fluid passes therethrough. If necessary, a continuous flow rate characteristic curve is obtained based on the flow rate coefficients in a plurality of flow rates to be measured.

To obtain the flow rate coefficient at a high resolution, the number of flow pulses sent per reference volume needs to be a predetermined number or more and, for example, a specification of 10,000 pulses or more is given to a large-sized stationary prover having a large reference volume. On the contrary, if the reference volume is reduced, more than a specified number of flow pulses cannot be issued, but the flow rate coefficient can be obtained from the relationship between the reference volume of a fluid displaced as a result of movement of the moving element such as the piston and the issued pulses (time) issued from the flowmeter during the movement. Accordingly, regardless of the reduced number of flow pulses, a small-sized prover (small volume prover) is available.

In the small volume prover (hereinafter, referred to as SVP), a piston prover is known that uses the piston as the moving element. The piston prover has a measurement cylinder with a constant section that is basically connected in series with a flowmeter to be tested and compares the volume of a fluid displaced when the piston moving in the measurement cylinder moves through certain distance with a reading of the flowmeter at that time. The volume of a fluid is actually obtained from the amount of movement of the piston. In the proving, ordinarily, plural times of test results are averaged to figure out the flow rate coefficient (K factor) based on the average value. Consequently, the piston reciprocates by the number of times of the test in the measurement cylinder for each of the flow rates to be measured.

To return the piston to its original position after the completion of the measurement by the movement of the piston through a specified distance in the measurement cylinder, the piston is driven against the flow of fluid by an actuator using hydraulic pressure or pneumatic pressure via a piston rod. A flow passage allowing a fluid to pass therethrough during the drive is provided by two manners, one using the measurement cylinder itself and the other using a bypass flow passage separately disposed in parallel with the measurement cylinder. In case of causing a fluid to pass through the measurement cylinder, a valve function is provided in the interior of the piston returned by the actuator such that the valve is closed at the time of the measurement and that it is opened in the return stroke. This method is called an internal valve method. In case of causing a fluid to pass through the bypass flow passage, a bypass valve is disposed in the bypass flow passage such that the valve is closed at the time of the measurement and that it is opened in the return stroke. This method is called an external valve method.

Known as such an SVP is one described in Patent Document 1 for example. To form the reference volume, the SVP is configured such that a detector switch detects a position of a marker attached to the piston rod secured to the measuring piston. Accordingly, invar (alloy having a low coefficient of thermal expansion) of the piston rod is grooved or processing such as ceramic coating is added to the entire invar. When returning the measuring piston to a predetermined upstream position, a hydraulic pressure is applied to an end face of the piston rod secured to the measuring piston to move the measuring piston toward upstream. A separately designed slide valve (piston valve) is used for the flow passage switching.

PRIOR ART DOCUMENT

Patent Document

Patent Document 1: Japanese Patent Publication No. 2796207

SUMMARY OF THE INVENTION

However, due to the structure of the SVP described in Patent Document 1 having the piston rod integrally secured to the measuring piston, e.g. when the measuring piston is subjected to a pressure in the rotating direction, there arises a problem that the piston rod works as a resistance to impede the rotation, imposing a load on the measuring piston. An excessive load on the measuring piston prevents the measuring piston from smoothly moving through the measurement cylinder, making accurate measurement difficult.

Due to its double-cylinder structure and due to the disposition of the slide valve for the flow passage switching, a separate mechanism for seal checking, etc., the SVP of Patent Document 1 has an increased number of parts and a complicated structure, resulting in no easy maintenance and increased cost.

The present invention was conceived in view of the above circumstances and it is an object thereof to provide a piston prover which enables smooth movement of a measuring piston through a measurement cylinder without imposing an excessive load on the measuring piston and which has a simplified structure with reduced number of parts.

To solve the above problems, a first technical means of the present invention is a piston prover comprising a measurement cylinder having an upstream end through which a fluid flows in and a downstream end through which the fluid flows out; a hydraulic cylinder coupled with the downstream end of the measurement cylinder; a measuring piston that moves a predetermined distance L from upstream toward downstream through the measurement cylinder during a measurement due to a fluid flown from the upstream end to eject a reference volume of fluid; and a piston rod that is movably accommodated in the hydraulic cylinder, wherein the measuring piston and the piston rod are separately constructed, and when returning the measuring piston to a predetermined upstream measurement standby position, the piston rod moves the measuring piston from downstream to upstream to set the measuring piston at the predetermined measurement standby position, and thereafter only the piston rod is moved from upstream to downstream and is accommodated in the hydraulic cylinder.

A second technical means is the first technical means wherein the measuring piston has a circumferentially embedded magnetic material, and the measurement cylinder has two detecting portions that detect the magnetic material embedded in the measuring piston at the predetermined distance apart from each other on the upstream side and the downstream side of the measurement cylinder.

A third technical means is the first technical means wherein an openable/closable valve communicating with the external air is provided on both the upstream end and the downstream end of the measurement cylinder.

According to the present invention, the measuring piston and the piston rod are separately constructed so that the measuring piston can move smoothly through the measurement cylinder without subjecting the measuring piston to an excessive load. As compared with the conventional prover, a simplified structure is achieved to reduce the number of parts and the cost.

DESCRIPTION OF THE PREFERRED EMBODIMENTS

A preferred embodiment of a piston prover according to the present invention will now be described with reference to the accompanying drawings.

Figure 1:
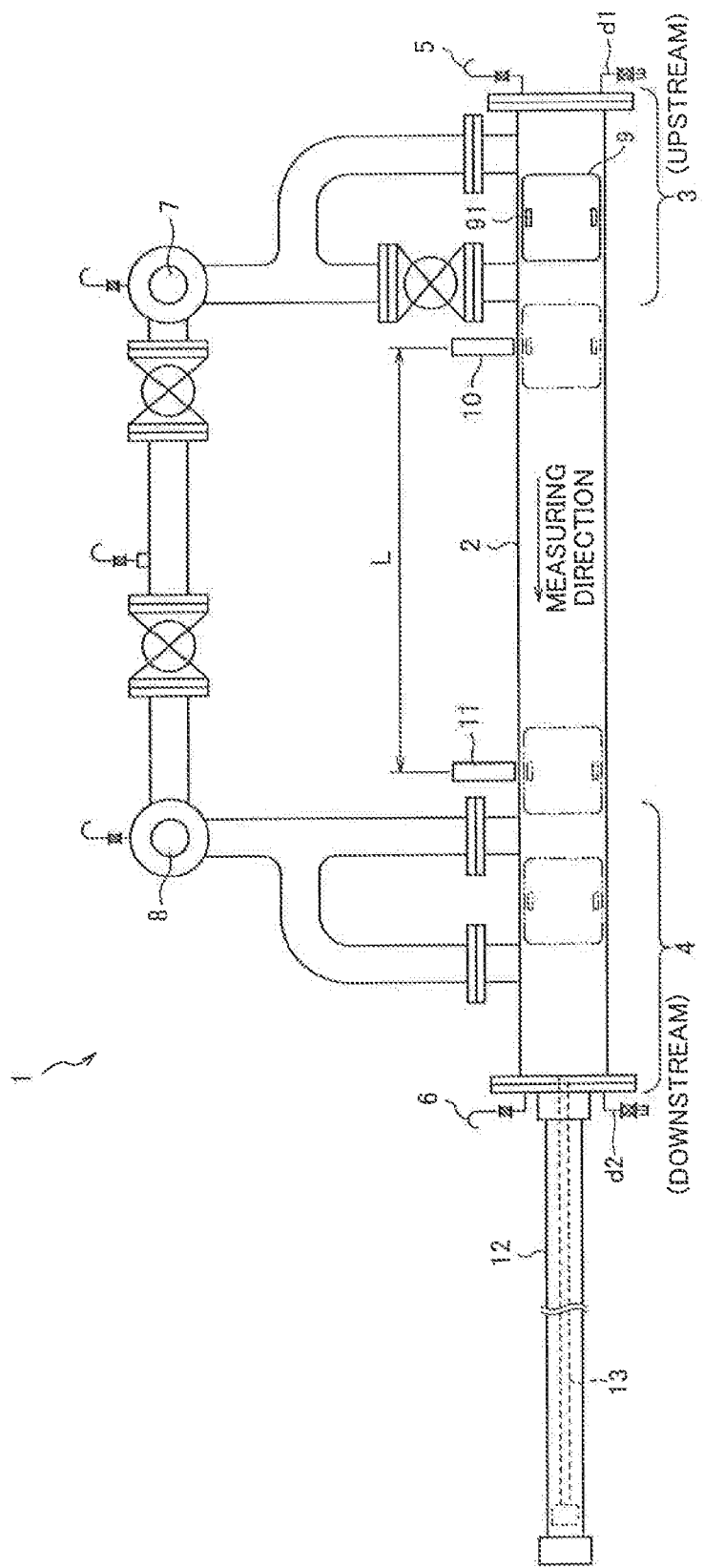
FIG. 1 is a front view of an external configuration example of a piston prover according to the present invention.
Figure 2:
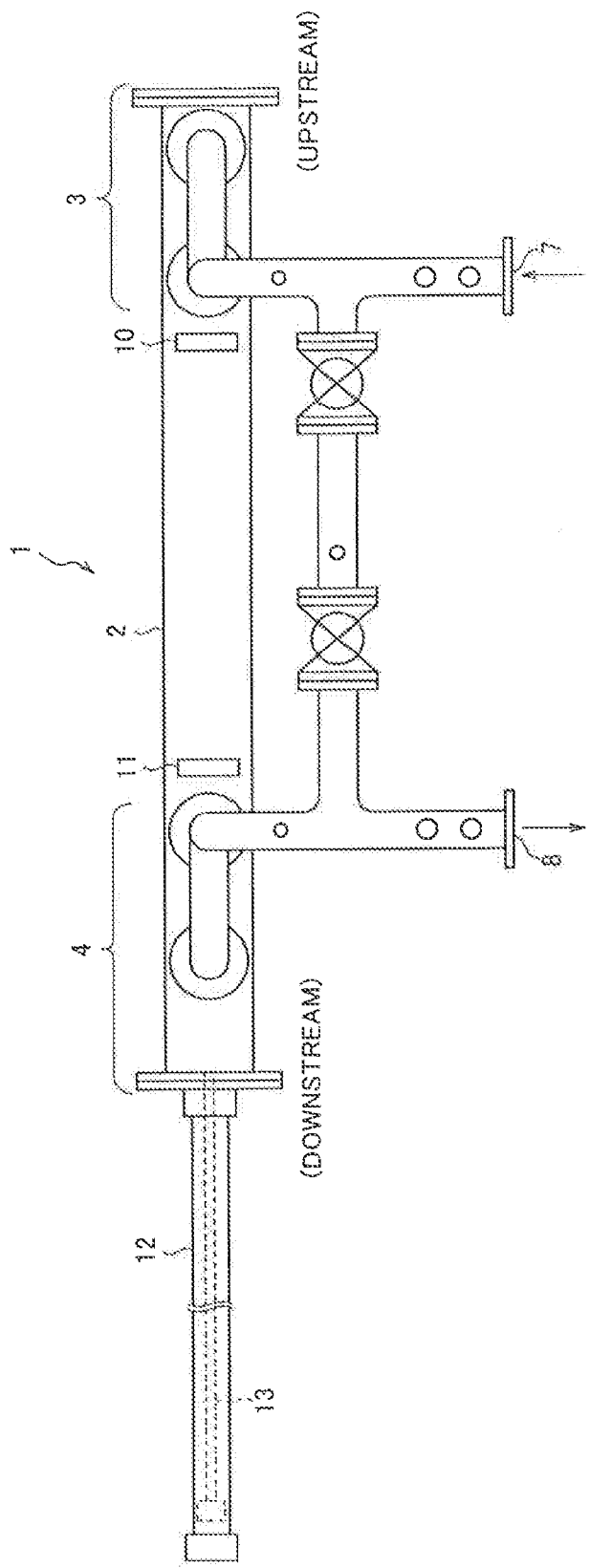
FIG. 2 is a top view of the external configuration example of the piston prover according to the present invention.

FIGS. 1 and 2 are diagrams depicting an external configuration example of the piston prover according to the present invention. FIG. 1 is a front view and FIG. 2 is a top view. In the diagrams, reference numeral 1 denotes a piston prover, 2 denotes a measurement cylinder, 3 denotes an upstream end, 4 denotes a downstream end, 5 and 6 denote air vent valves, 7 denotes a fluid inlet, 8 denotes a fluid outlet, 9 denotes a measuring piston, 10 and 11 denote magnetic switches, 12 denotes a hydraulic cylinder, 13 denotes a piston rod, and d1 and d2 denote drains (drain valves).

The piston prover 1 includes the measurement cylinder 2 having the upstream end 3 through which a fluid flows in and the downstream end 4 through which the fluid flows out; the hydraulic cylinder 12 coupled with the downstream end of the measurement cylinder 2; the measuring piston 9 that moves a predetermined distance L from upstream toward downstream through the measurement cylinder 2 during measurement due to a fluid flown from the upstream end 3 to eject a reference volume of fluid; and the piston rod 13 is movably accommodated in the hydraulic cylinder 12. The measuring piston 9 is formed from e.g. aluminum and the measurement cylinder 2 is formed from e.g. SUS (stainless steel).

The measuring piston 9 is inserted as a moving element into the measurement cylinder 2 and, during the measurement, is caused to move by the fluid pressure of a fluid to be measured, to eject a reference volume of fluid. The piston rod 13 is inserted into the hydraulic cylinder 12 and is slid therethrough while being supported in a liquid-tight manner by a journal bearing (not depicted) disposed on an outflow end face plate making up the downstream end 4. The air vent valves 5 and 6 and the drains d1 and d2 are openable/closable valves communicating with the external air and are properly opened/closed depending on the action state of the piston prover 1.

In the piston prover 1 of the present invention, the measuring piston 9 and the piston rod 13 are separately constructed. When performing a return movement of returning the measuring piston 9 to a predetermined upstream measurement; standby position, the piston rod 13 moves the measuring piston 9 from downstream to upstream to set the measuring piston 9 at the predetermined measurement standby position, after which only the piston rod 13 is moved from upstream to downstream and is accommodated in the hydraulic cylinder 12.

The measuring piston 9 has a circumferentially embedded magnetic material 91. Spaced apart a predetermined distance L (upstream and downstream) along the longitudinal direction of the measurement cylinder 2, the measurement cylinder 2 has the magnetic switches 10 and 11 corresponding to two detection portions that detect the magnetic material 91 embedded in the measuring piston 9. These two magnetic switches 10 and 11 detect the movement of the measuring piston 9 through the predetermined distance L. That is, the reference volume is a fluid volume ejected by the movement of the measuring piston 9 through the predetermined distance L. The predetermined distance L between the magnetic switches 10 and 11 is variable so that the reference volume can be adjusted.

Figure 3:
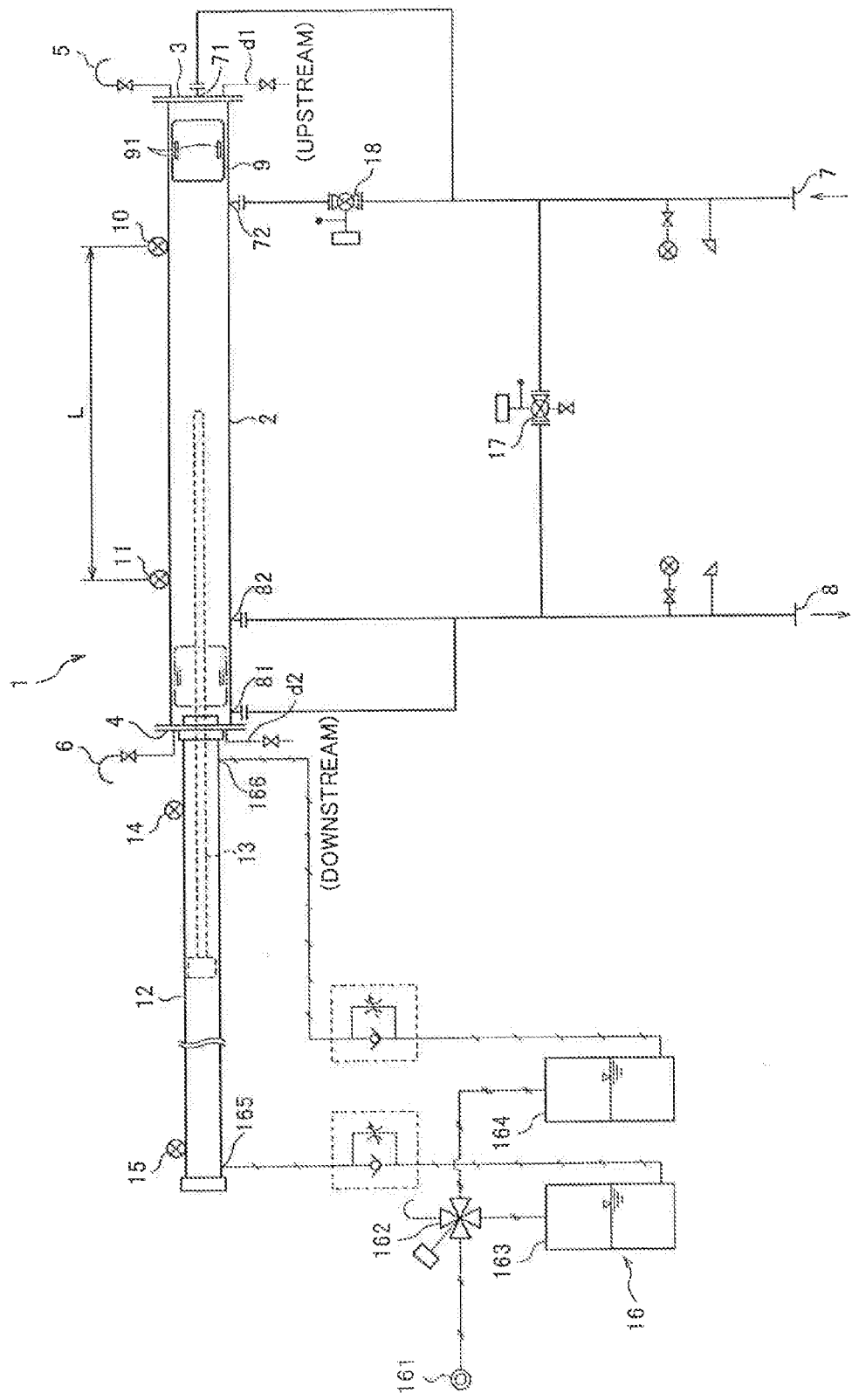
FIG. 3 is a top view diagrammatically depicting a configuration example of a proving system including the piston prover according to the present invention.

FIG. 3 is a view diagrammatically depicting a configuration example of a proving system including the piston prover according to the present invention. In the diagram, reference numerals 14 and 15 denote magnetic switches, 16 denotes a pneumatic/hydraulic pressure converting unit, 17 denotes a flow passage switching valve, 18 denotes a measurement starting valve, 71 denotes a first cylinder inlet, 72 denotes a second cylinder inlet, 81 denotes a first cylinder outlet, and 82 denotes a second cylinder outlet. The fluid inlet 7 is connected to the first cylinder inlet 71 and the second cylinder inlet 72 and the fluid outlet 8 is connected to the first cylinder outlet 81 and the second cylinder outlet 82. The fluid inlet 7 and the fluid outlet 8 are connected to each other via the flow passage switching valve 17.

The pneumatic/hydraulic pressure converting unit 16 is configured to include a pneumatic pressure supply source 161, a switching valve 162 such as a four-way solenoid valve, pneumatic/hydraulic pressure converting portions 163 and 164, and a pressure feed ports 165 and 166. A supply destination of a pneumatic pressure from the pneumatic pressure supply source 161 is switched by the switching valve 162 so that the pneumatic pressure is supplied to either the pneumatic/hydraulic pressure converting portion 163 or the pneumatic/hydraulic pressure converting portion 164. The pneumatic/hydraulic pressure converting portion 163 converts the pneumatic pressure supplied from the pneumatic pressure supply source 161 into a hydraulic pressure and supplies the converted hydraulic pressure through the pressure feed port 165 into the hydraulic cylinder 12. This moves the piston rod 13 toward the measurement cylinder 2.

Similarly, the pneumatic/hydraulic pressure converting portion 164 converts the pneumatic pressure supplied from the pneumatic pressure supply source 161 into a hydraulic pressure and supplies the converted hydraulic pressure through the pressure feed port 166 into the hydraulic cylinder 12. This moves the piston rod 13 away from the measurement cylinder 2. Namely, the pneumatic/hydraulic pressure converting unit 16 is a device that introduces a hydraulic pressure into the hydraulic cylinder 12 or discharges a hydraulic pressure from the interior of the hydraulic cylinder 12 by opening/closing the pressure feed ports 165 and 166 so that the piston rod 13 is moved or kept in the hydraulic cylinder 12.

A magnetic material not depicted is embedded circumferentially around a head portion making up the piston rod 13 so that it can be detected by the two magnetic switches 14 and 15 disposed on the outer periphery of the hydraulic cylinder 12 to locate the position of the piston rod 13 in the hydraulic cylinder 12.

Specifically, except the return movement for returning the measuring piston 9 to the predetermined upstream measurement standby position, the piston rod 13 is accommodated in the hydraulic cylinder 12 and, in this state, positioned in the vicinity of the magnetic switch 15, turning the magnetic switch on. It is therefore specified if the magnetic switch 15 is on that the piston rod 13 is accommodated in the hydraulic cylinder 12. In the return movement, the piston rod 13 moves toward the measurement cylinder 2 to turn the magnetic switch from on to off. It is therefore specified if the magnetic switch 15 is off that the return movement causes the piston rod 13 to protrude from the hydraulic cylinder 12 into the measurement cylinder 2. When as a result of the return movement the measuring piston 9 returns to the measurement standby position, the magnetic switch 14 turns from off to on.

As described above, the configuration is such that the pneumatic/hydraulic pressure converting unit 16 performs a proper hydraulic control depending on the state of the piston rod 13 in the hydraulic cylinder 12 so as to move or keep the piston rod 13.

In the piston prover 1 of the present invention, as described above, the measuring piston 9 and the piston rod 13 are separately constructed so that during the return movement, the piston rod 13 moves the measuring piston 9 from downstream to upstream to set the measuring piston 9 at the predetermined measurement standby position, after which only the piston rod 13 is moved from upstream to downstream and is accommodated in the hydraulic cylinder 12. The measuring piston 9 after the movement is set at the predetermined upstream measurement standby position and, by closing the measurement starting valve 18 with the flow passage switching valve 17 closed, a fluid flown from the fluid inlet 7 flows through the first cylinder inlet 71 into the measurement cylinder 2. The pressure of this fluid causes the measuring piston 9 to move downstream to perform a measurement.

Adoption of the above structure enables a smooth movement of the measuring piston 9 through the Measurement cylinder 2 without subjecting the measuring piston 9 to an excessive load even though the measuring piston 9 performs rotation, etc. during the measurement, thus ensuring an accurate measurement.

Figure 4:
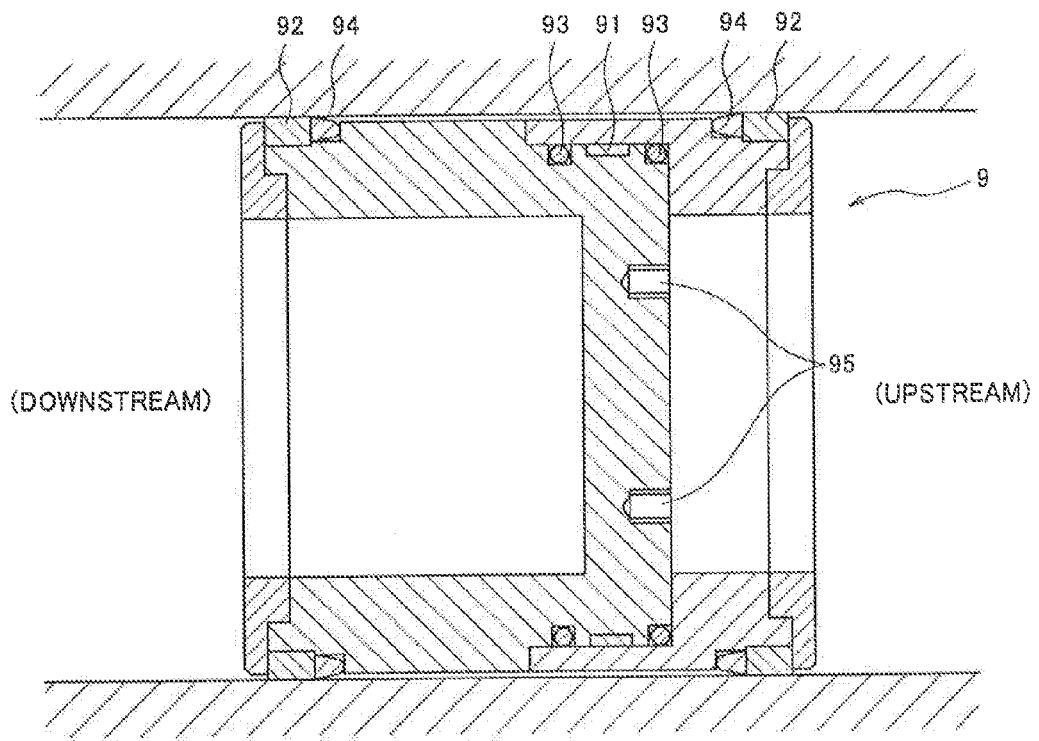
FIG. 4 is a top view depicting a configuration example of a measuring piston.

FIG. 4 is a view depicting a configuration example of the measuring piston. The measuring piston 9 includes the magnetic material 91 such as a magnet, a guide ring 92 made of reinforced Teflon (Teflon: registered trademark), etc., an O ring 93 made of NBR (nitrile butadiene rubber), etc., a sealing member 94 such as an omni-seal, and a waste tap 95 for piston fitting. In the conventional detection method of a detector signal, the piston rod secured to the measuring piston was made of invar with a need to groove the invar or to apply a ceramic coating to the entire invar. Hence, it necessitated additional processing such as coating surface grinding or attachment of a detector switch, resulting in an increase in the number of manufacturing steps. The present invention however has a simplified configuration where the measuring piston is provided with the magnetic material which is detected by the magnetic switch, thereby enabling a reduction in the number of manufacturing steps.

In FIG. 3, at both the upstream end and the downstream end of the measurement cylinder 2, the piston prover 1 is provided with the air vent valves 5 and 6 as an example of the openable/closable valves communicating with the external air. Either one of the air vent valves 5 and 6 is used to enable a seal check between the measurement cylinder 2 and the measuring piston 9. In the conventional seal check method, every time the measuring piston performs the return movement, a leak from the omni-seal of the measuring piston and the slide (piston) valve was automatically checked as a differential pressure by applying a pressure to the gap therebetween. In this case, a differential pressure generator is separately needed, resulting in a complicated structure which causes troubles such as failures.

The seal check method of the present invention performs the leak check by setting the measuring piston 9 at a predetermined most downstream position for example of the measurement cylinder 2 and manually operating the air vent valve 6 while applying a pressure of an actual fluid from upstream. Reversing upstream and downstream, the leak check may be performed by setting the measuring piston 9 at a predetermined most upstream position of the measurement cylinder 2 and manually operating the air vent valve 5 while applying a pressure of an actual fluid from downstream.

In this manner, according to the seal check method of the present invention, there is no need for a device such as the differential pressure generator and it can be checked using only the air vent valve of the measurement cylinder whether a leak occurs, thus enabling a reduction in the number of parts in the manufacturing steps. In the parts replacement at the periodic check, etc., the omni-seal of the measuring piston has only to be replaced, making the maintenance easy.

Figure 5:
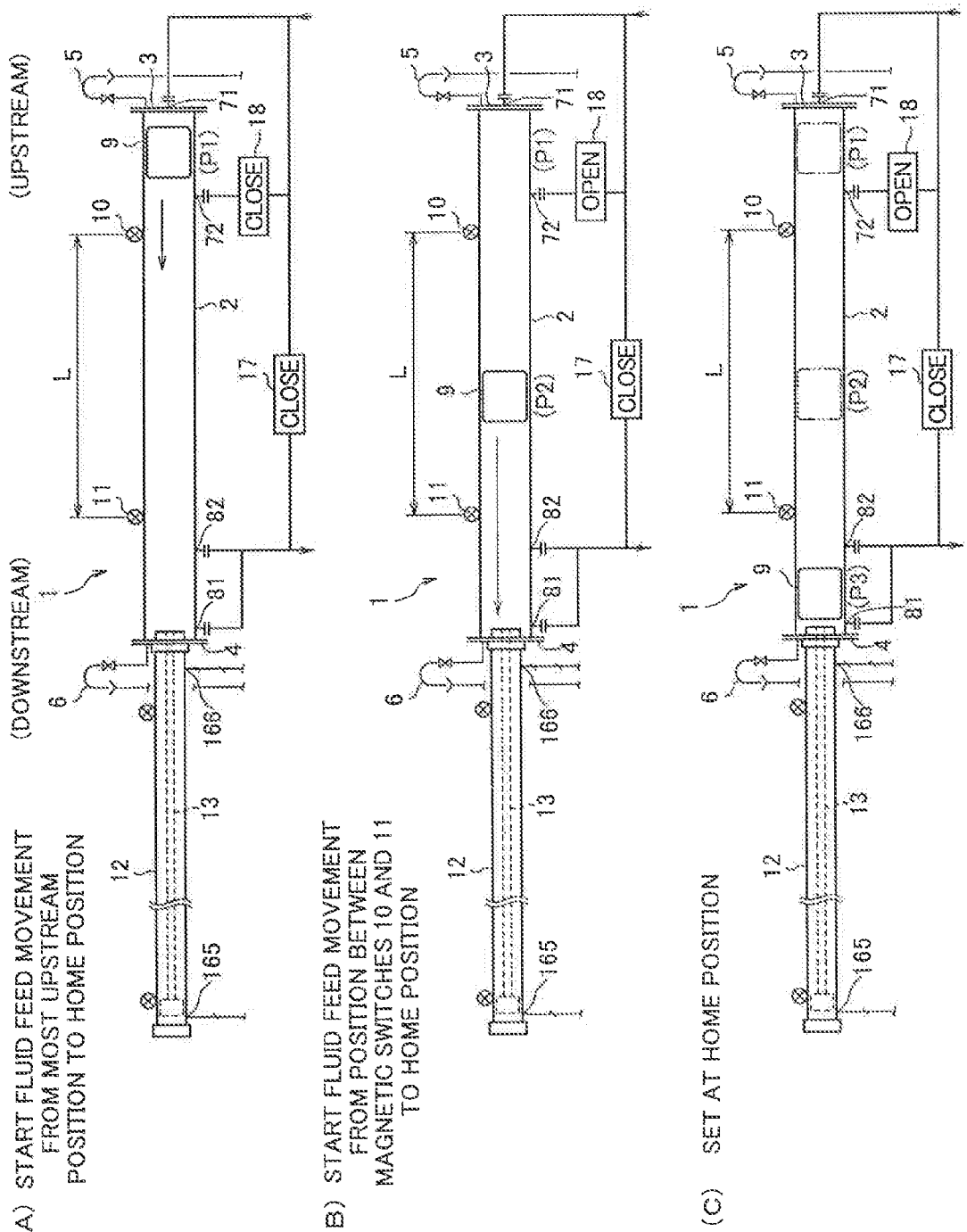
FIG. 5 is a view for explaining an initial movement example of the piston prover according to the present invention.
Figure 6:
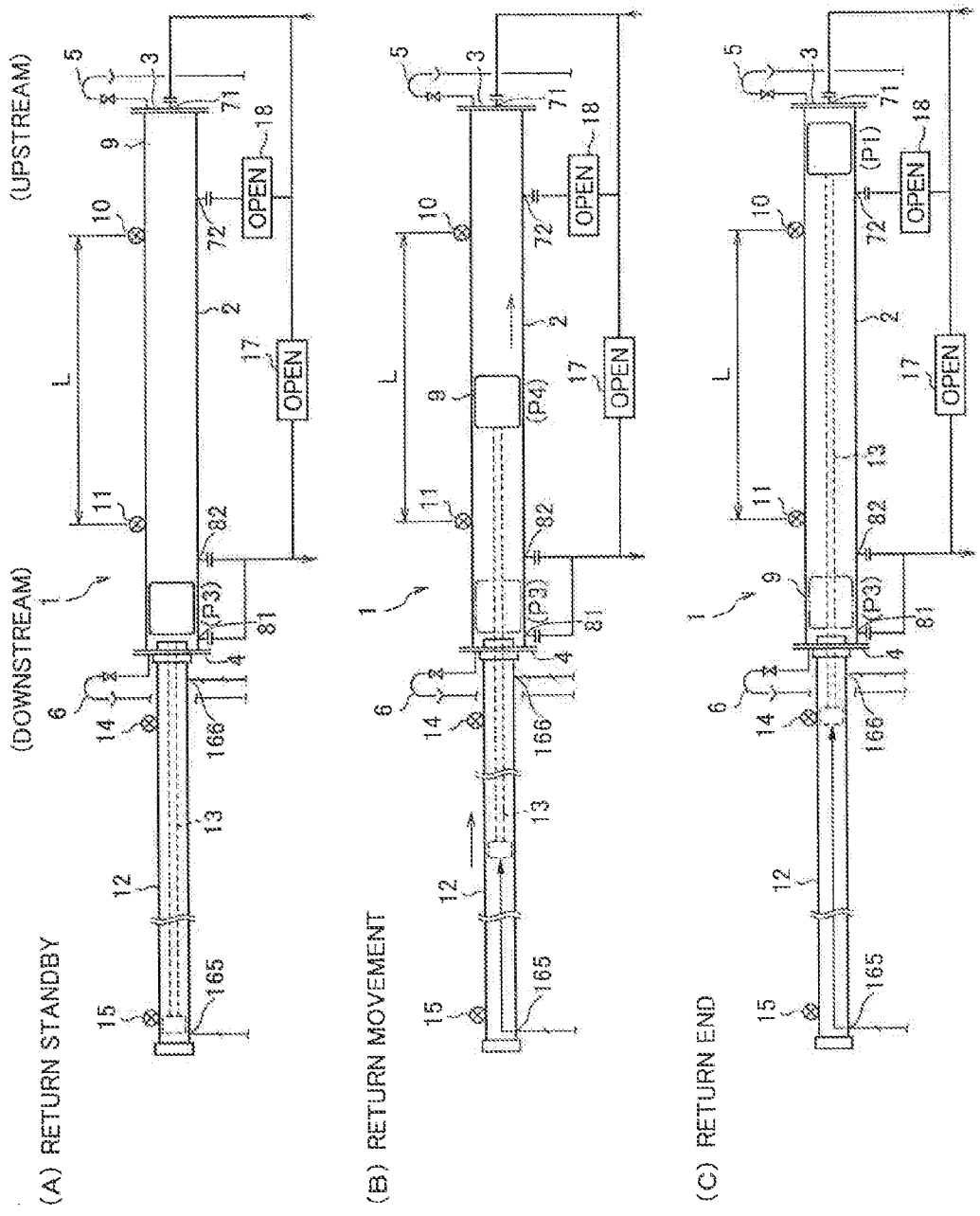
FIG. 6 is a view for explaining a return movement example of the piston prover according to the present invention.
Figure 7:
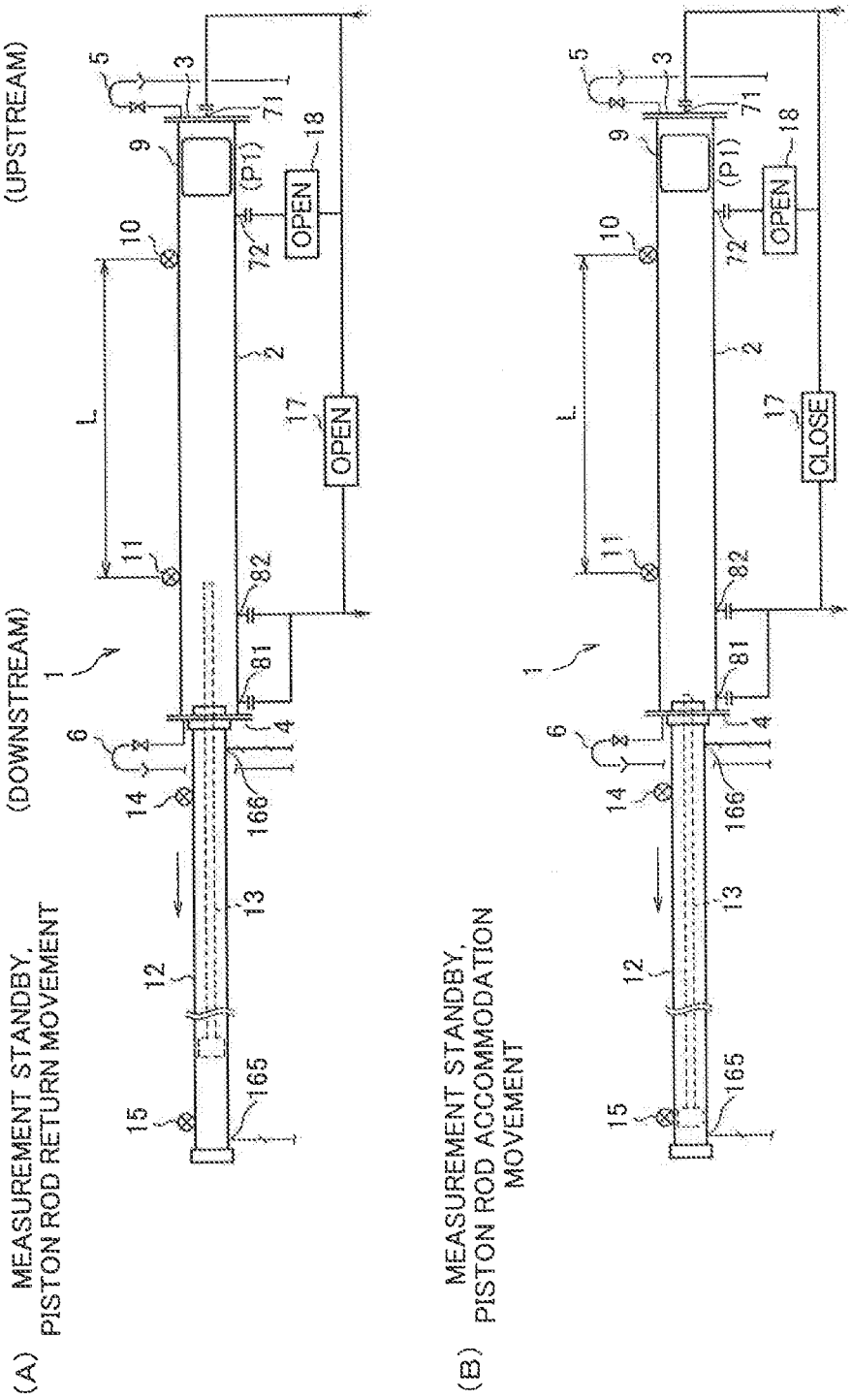
FIG. 7 is a view for explaining a measurement warm-up operation example of the piston prover according to the present invention.
Figure 8:
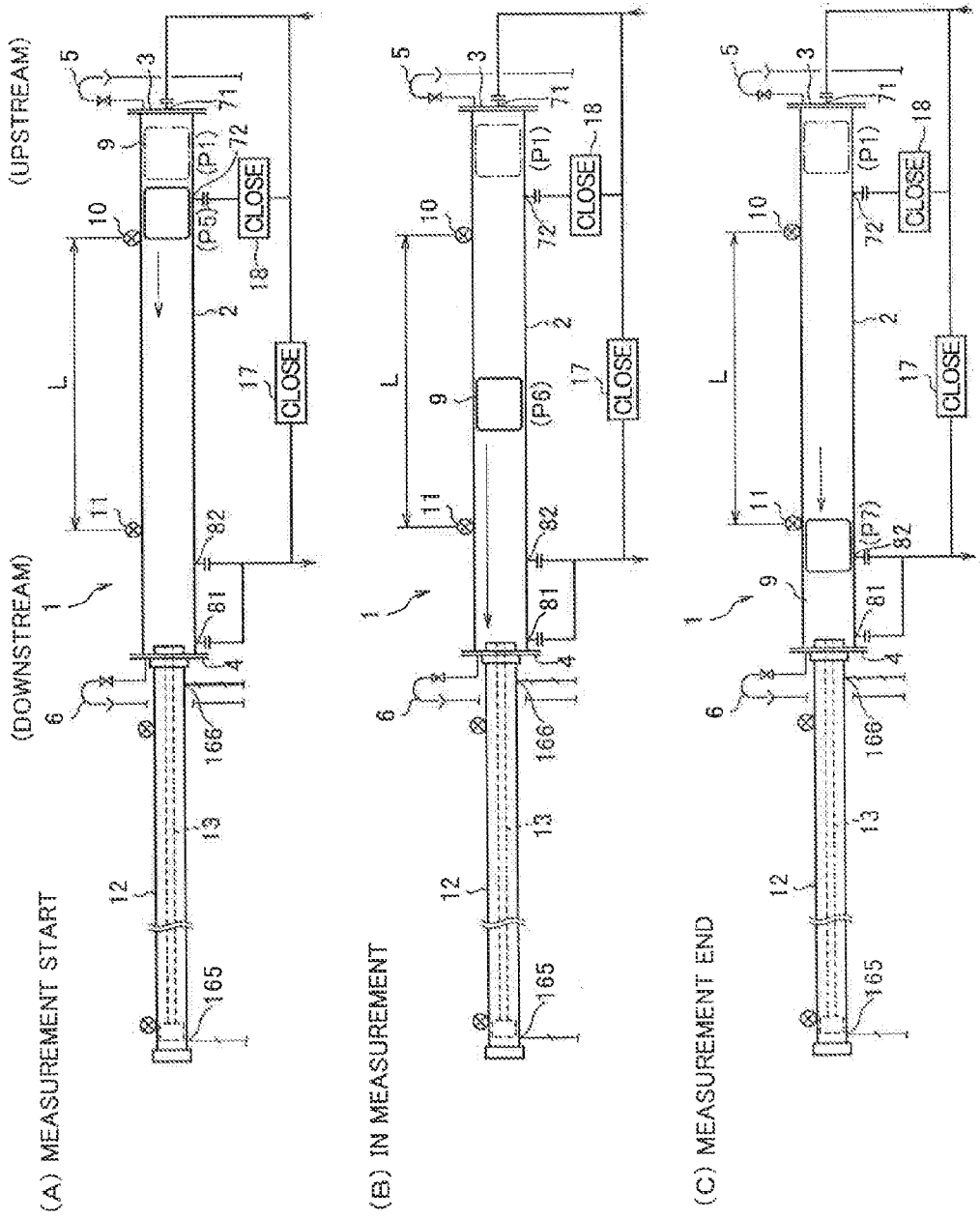
FIG. 8 is a view for explaining a measurement action example of the piston prover according to the present invention.

FIGS. 5 to 8 are views for explaining action examples of the piston prover according to the present invention. FIG. 5 is a view explaining the initial movement, FIG. 6 is a view explaining the return movement, FIG. 7 is a view explaining the measurement warm-up operation, and FIG. 8 is a view explaining the measurement action.

In the initial movement of FIG. 5, when the measuring piston 9 is at a most upstream position (measurement standby position) P1 in starting a fluid feed from the fluid inlet 7, the piston prover 1 closes both the flow passage switching valve 17 and the measurement starting valve 18 to allow a fluid to flow in through the first cylinder inlet 71. As a result, as depicted in FIG. 5(A), the measuring piston 9 moves downstream by the fluid pressure. The state of FIG. 5(A) is based on the assumption that the interior of the measurement cylinder 2 is not filled with fluid.

When the measuring piston 9 is at a position P2 between the magnetic switches 10 and 11, the piston prover 1 closes the flow passage switching valve 17 and opens the measurement starting valve 18 to allow a fluid to flow in through the first cylinder inlet 71 and the second cylinder inlet 72. As a result, as depicted in FIG. 5(B), the measuring piston 9 moves downstream by the fluid pressure. Similar to the case of FIG. 5(A), the state of FIG. 5(B) is also based on the assumption that the interior of the measurement cylinder 2 is not filled with fluid. If the position of the measuring piston 9 cannot be located, both the flow passage switching valve 17 and the measurement starting valve 18 are closed so that a fluid flows in through the first cylinder inlet 71.

As depicted in FIG. 5(C), the measuring piston 9 moved as described above is set at a downstream home position P3 and, in case of FIG. 5(A), the measurement starting valve 18 is closed. In case of FIG. 5(B), the measurement starting valve 18 is already opened and hence remains unchanged. In all cases, the flow passage switching valve 17 remains closed. At the home position P3, the measuring piston 9 is kept at substantially an intermediate position between the first cylinder outlet 81 and the second cylinder outlet 82.

In the return movement of FIG. 6, as depicted in FIG. 6(A), the flow passage switching valve 17 is opened with the measuring piston 9 being set at the home position P3. A hydraulic pressure is then applied from the pressure feed port 165 to the piston rod 13 to move the piston rod 13 as depicted in FIGS. 6(B) and 6(C) to move the measuring piston 9 from the home position P3 to P4 and further to the predetermined upstream measurement standby position P1 at which the measuring piston 9 is set. At this time, the movement of the piston rod 13 causes the magnetic switch 15 to turn from on to off. When the magnetic switch 14 turns from off to on, it is determined that the measuring piston 9 has arrived at the measurement standby position P1. At the measurement standby position P1, the measuring piston 9 is kept at substantially an intermediate position between the first cylinder inlet 71 and the second cylinder inlet 72.

In the measurement warm-up operation of FIG. 7, after the setting of the measuring piston 9 at the predetermined upstream measurement standby position P1 as describe above, a hydraulic pressure is applied from the pressure feed port 166, opposite to the case of FIG. 6, to the piston rod 13 to return the piston rod 13 to its original position in the hydraulic cylinder 12 as depicted in FIGS. 7(A) and 7(B). The flow passage switching valve 17 is then closed as depicted in FIG. 7(B) to terminate the measurement standby. In this state, the measurement cylinder 2 is filled with fluid. At this time, the movement of the piston rod 13 causes the magnetic switch 14 to turn from on to off. When the magnetic switch 15 then turns from off to on, it is determined that the piston rod 13 has returned to its original position in the hydraulic cylinder 12.

In the measurement action of FIG. 8, when the measurement starting valve 18 is closed to allow a fluid to flow in through the first cylinder inlet 71, the measuring piston 9 moves downstream by the fluid pressure as depicted in FIG. 8(A). At this time, when the measuring piston 9 arrives at position P5, the magnetic switch 10 is turned on, to start a measurement therefrom. When the measuring piston 9 then moves through position P6 as depicted in FIG. 8(B) and arrives at position P7 as depicted in FIG. 8(C), the magnetic switch 11 is turned on. Consequently, the measuring piston 9 is regarded as having ejected a reference volume of fluid, to terminate the measurement. The measuring piston 9 is then set at the home position P3 depicted in FIG. 5(C), after which the return movement of FIG. 5, the measurement warm-up operation of FIG. 7, and the measurement action of FIG. 8 are iteratively executed a required number of times.

As set forth hereinabove, according to the present invention, by virtue of the separate structure of the measuring piston and the piston rod, the measuring piston can move smoothly through the measurement cylinder without subjecting the measuring piston to an excessive load in measurement, to ensure an accurate measurement. By virtue of the simplified structure as compared with the conventional prover, a reduction in the parts count and in cost is achieved.

EXPLANATION OF REFERENCE NUMERALS

1 . . . piston prover, 2 . . . measurement cylinder, 3 . . . upstream end, 4 . . . downstream end, 5,6 . . . air vent valve, 7 . . . fluid inlet, 71 . . . first cylinder inlet, 72 . . . second cylinder inlet, 8 . . . fluid outlet, 81 . . . first cylinder outlet, 82 . . . second cylinder outlet, 9 . . . measuring piston, 91 . . . magnetic material, 92 . . . guide ring, 93 . . . O ring, 94 . . . omni-seal, 95 . . . waste tap for piston fitting, 10,11,14,15 . . . magnetic switch, 12 . . . hydraulic cylinder, 13 . . . piston rod, 16 . . . pneumatic/hydraulic pressure converting unit, 161 . . . pneumatic pressure supply source, 162 . . . switching valve, 163,164 . . . pneumatic/hydraulic pressure converting portion, 165, 166 . . . pressure feed port, 17 . . . flow passage switching valve, and 18 . . . measurement starting valve.

The invention claimed is:

1. A piston prover comprising a measurement cylinder having an upstream end through which a fluid flows in and a downstream end through which the fluid flows out; a hydraulic cylinder coupled with the downstream end of the measurement cylinder; a measuring piston that moves a predetermined distance L from upstream toward downstream through the measurement cylinder during a measurement due to a fluid flown from the upstream end to eject a reference volume of fluid; and a piston rod that is movably accommodated in the hydraulic cylinder, wherein the measuring piston and the piston rod are separately constructed, and when returning the measuring piston to a predetermined upstream measurement standby position, the piston rod moves the measuring piston from downstream to upstream to set the measuring piston at the predetermined measurement standby position, and thereafter only the piston rod is moved from upstream to downstream and is accommodated in the hydraulic cylinder.

2. The piston prover as defined in claim 1, wherein the measuring piston has a circumferentially embedded magnetic material, and the measurement cylinder has two detecting portions that detect the magnetic material embedded in the measuring piston at the predetermined distance apart from each other on the upstream side and the downstream side of the measurement cylinder.

3. The piston prover as defined in claim 1, wherein an openable/closable valve communicating with the external air is provided on both the upstream end and the downstream end of the measurement cylinder.

* * * * *